J. R. S. SMITH.
AUTOMOBILE GEAR.
APPLICATION FILED APR. 21, 1915.
1,188,852.
Patented June 27, 1916.
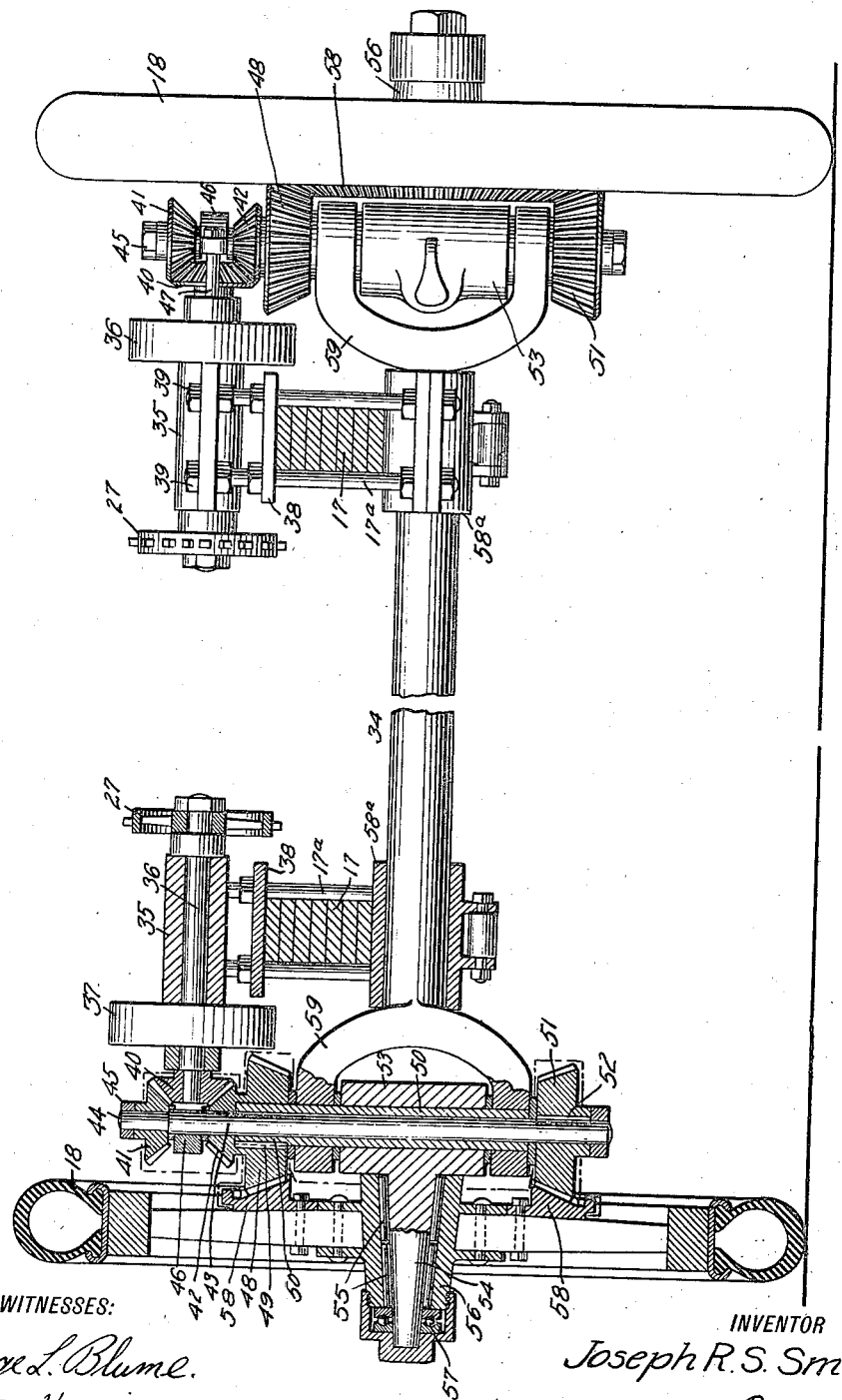
WITNESSES:
George L. Blume.
Walton Harrison
INVENTOR
Joseph R. S. Smith.
BY
ATTORNEY

UNITED STATES PATENT OFFICE.

JOSEPH RYAN STILL SMITH, OF PLACERVILLE, COLORADO.

AUTOMOBILE-GEAR.

1,188,852.

Specification of Letters Patent. Patented June 27, 1916.

Application filed April 21, 1915. Serial No. 22,811.

*To all whom it may concern:*

Be it known that I, JOSEPH R. S. SMITH, a citizen of the United States, and a resident of Placerville, in the county of San Miguel, and State of Colorado, have invented a new and Improved Automobile-Gear, of which the following is a full, clear, and exact description.

My invention relates to automobile gear and particularly includes the mechanism of the driving gear.

More particularly stated I seek to provide a driving gear of improved construction by aid whereof the power may be divided equally and transmitted to different service wheels engaging the ground in such manner that when the vehicle is steered in different directions each service wheel receives substantially the same amount of power as any other service wheel even though some of the service wheels be turned in steering to a greater extent than other service wheels located upon the different portions of the vehicle.

Various other objects are attained by my invention and are brought out in the description below.

In the drawing the figure is a view partly in elevation and partly in section illustrating my improvements.

Referring now to this figure, my improvements are shown in connection with certain parts of a motor driven vehicle, of which one of the axles appears at 34 with the usual body supporting springs at 17. Disposed above these springs 17 are bearings 35, and extending through these bearings are revoluble shafts 36 to which power is applied through sprocket wheels 27. Mounted fixedly upon these shafts 36 are brake drums 37 which are to be engaged by brake bands. I will not describe the brake mechanism as it constitutes no part of my present invention. Engaging the vehicle springs 17 are clamping bolts 17ª and clamping plates 38. Nuts 39 are fitted upon the upper portions of the bolts 17ª and by aid of these nuts the bearings 35 are adjustably held in position. Mounted fixedly upon each revoluble shaft 36 is a bevel pinion 40 which meshes with another bevel pinion 41. A second bevel pinion 42 meshes with the bevel pinion 40 and is loose relatively to a vertical shaft 43. This shaft at its upper end is provided with a portion 44 of reduced diameter. The bevel pinion 41 is loose relatively to this reduced portion 44, which extends through it. A nut 45 prevents the bevel pinion 41 from being displaced. A bearing 46 engages the upper portion of the shaft 43 and is held in position by hanger bars 47. A bevel gear 48 is integral with the bevel pinion 42, these two parts together being secured by a key 49 to the upper end of a revoluble sleeve 50 which encircles the shaft 43. The shaft 43 at its lower end carries a bevel gear 51 which is secured to it by a key 52. Steering knuckles are shown at 53 and are provided with outwardly extending spindles 54. Each of these spindles is engaged by rollers 55 and provided with ball bearings 57. Encircling each spindle 54 is a hub 56 which, by virtue of the rollers 55 and ball bearing 57 is relieved of undue friction as it turns. Each wheel 18 carries a bevel gear 58, the latter meshing with the bevel gears 48 and 51. The knuckle forks carried by the axles 34 serve as bearings for the sleeve 50. At 58ª are bearings which support the vehicle springs 17 and are secured directly upon the axles 34. When each horizontal shaft 36 is turned, the bevel pinion 40 causes the bevel pinions 41 and 42 to turn in opposite directions and therefore the shaft 43 and sleeve 50 likewise turn in opposite directions. The bevel gears 48 and 51, by turning in opposite directions of course coact in driving the bevel gear 48. Power is then applied to the road wheel 18 at two distinct points, that is to say, the power is divided and half of it is supplied to the road wheel at a point above its axis of rotation, the other half of the power being supplied to the road wheel at a point below its axis. This arrangement distributes the strain due to driving the road wheels, and enables the various parts to be made with a minimum of material. Moreover, the wear and tear of the various parts is so apportioned that the parts tend to last for equal periods of time.

Having thus described my invention, I claim as new and desire to secure by Letters Patent:

1. In a driving mechanism for vehicles, the combination of an axle, a fork mounted thereupon, a tubular shaft extending through said fork and journaled relatively to the same, a second shaft extending through said tubular shaft, gear members connected with said tubular shaft and to said second mentioned shaft for the purpose of turning the same in opposite directions, a gear pinion mounted fixedly upon said tubular shaft, another gear pinion mounted fixedly upon said second mentioned shaft, a third gear member meshing with said first mentioned gear member and also with said second mentioned gear member, a road wheel carrying said third mentioned gear member, a spindle for supporting said road wheel, and a steering knuckle carrying said spindle and provided with a portion encircling said tubular shaft and loose relatively to the same.

2. A driving gear for vehicles including a road wheel, a steering knuckle on which said wheel is journaled, a vertical shaft forming the working fulcrum of said steering knuckle, a gear carried by said road wheel, a sleeve rotatable on said vertical shaft, a pair of gears, one of which is secured on the shaft and the other of which is secured upon said sleeve, said gears being located upon respectively opposite sides of said steering knuckle and in engagement with said wheel gear at diametrically opposite points thereof, a source of power, and connections for transmitting rotation to said shaft and its sleeve in relatively opposite directions.

In testimony whereof I have signed my name to this specification in the presence of two subscribing witnesses.

JOSEPH RYAN STILL SMITH.

Witnesses:
  DON TAYLOR,
  JOS. L. TAYLOR.